United States Patent [19]

Vario

[11] Patent Number: 5,065,981
[45] Date of Patent: Nov. 19, 1991

[54] WATER LINE TEST CAP

[76] Inventor: Fred F. Vario, 1057 Waterman Rd., Jefferson Borough, Pa. 15025

[21] Appl. No.: 594,693

[22] Filed: Oct. 9, 1990

[51] Int. Cl.[5] ............................................. F16L 55/10
[52] U.S. Cl. .................................... 251/148; 73/49.8; 138/89
[58] Field of Search .................. 220/254, 288; 138/89, 138/90; 251/148; 73/49.8, 49.1, 46

[56] References Cited

U.S. PATENT DOCUMENTS

| | | | |
|---|---|---|---|
| 3,814,135 | 6/1974 | Hetzer et al. | 138/89 |
| 3,884,070 | 5/1975 | Windle | 73/49.5 X |
| 4,813,569 | 3/1989 | Ruiz | 220/254 |
| 4,887,646 | 12/1989 | Groves | 138/90 |

*Primary Examiner*—Martin P. Schwadron
*Assistant Examiner*—Kevin L. Lee
*Attorney, Agent, or Firm*—Joseph J. Carducci

[57] ABSTRACT

A water line test cap is claimed comprising an elongated body closed at one end and having an elongated cylindrical recess and external threads at the other end thereof, an internally-threaded nut threaded to the elongated body, the nut being provided with a bore communicating with the elongated cylindrical recess and an expandable O-ring disposed therein, the cylindrical recess, the bore and said O-ring being linearly disposed and having the same internal diameter sufficient to permit the entry of a water pipe therein. In a preferred embodiment, the water line test cap is also provided with means to bleed the interior of air.

4 Claims, 1 Drawing Sheet

WATER LINE TEST CAP

BACKGROUND OF THE INVENTION

1. Field of the Invention

This invention relates to a test cap for sealing temporarily the open end of a water pipe line for the purpose of checking for possible water leakage in the water line.

2. Description of the Prior Art

When a building, such as an apartment house, or a single-family home, is under construction, the main plumbing lines are generally installed in the framework of the building before the wall covering boards are attached. Thus the plumbing system can be tested for visible leakages immediately and any repairs needed can be made promptly and with minimum additional expense.

The present procedure used in checking for visible leakages in plumbing systems is time-consuming and therefore adds to the cost of installing a satisfactory plumbing system. Thus, for example, at each outlet the outer edge of the copper pipe must be sanded and then a soldering paste must be applied thereto. Similarly, the interior of a soldering cap must be sanded and a soldering paste must be applied thereto. After the cap is placed over the end of the pipe, the pipe and the cap are preheated with a soldering torch to bring them to a proper temperature level for tinning and solder is then applied. After the unit cools, the plumbing line is tested. If there is any air in the line, bleeding thereof must be done using a separate means. At the end of the test period, the entire end of the pipe, including the cap, must be cut off so that the proper fixture can be attached thereto.

U.S. Pat. No. 4,813,569 to Ruiz discloses a device for sealing an open end of a plumbing drain pipe for leak testing the pipe that is not adaptable or useful with normal plumbing lines.

SUMMARY OF THE INVENTION

I have discovered a water line test cap that is eminently suitable for use in detecting leakage in a water line and that is easily attached, easily removed and, in its preferred embodiment, can also be used to bleed air from a water line. The novel water line test cap comprises an elongated body closed at one end and having an elongated cylindrical recess and external threads at the other end thereof, an internally threaded nut threaded to said elongated body, said nut being provided with a bore communicating with said elongated cylindrical recess and an expandable O-ring disposed therein adjacent to said bore, said cylindrical recess, said bore and said O-ring being linearly disposed and having the same internal diameter just sufficient to permit the entry of a water pipe therein. In a preferred embodiment, the closed end of said body is provided with means to bleed the interior of said water line test cap.

BRIEF DESCRIPTION OF THE INVENTION

Figure 1:
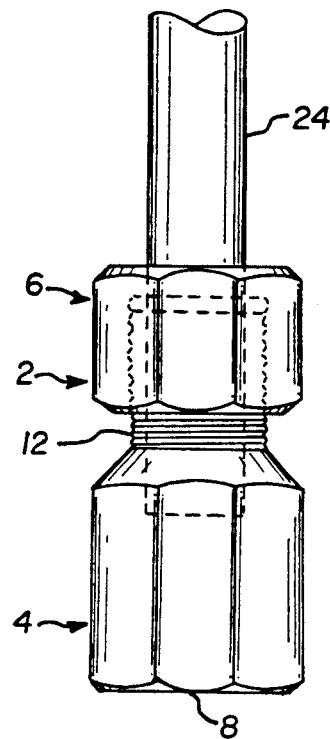
FIG. 1 is a side elevation view of the novel water line test cap, claimed herein, with a water line positioned therein.
Figure 2:
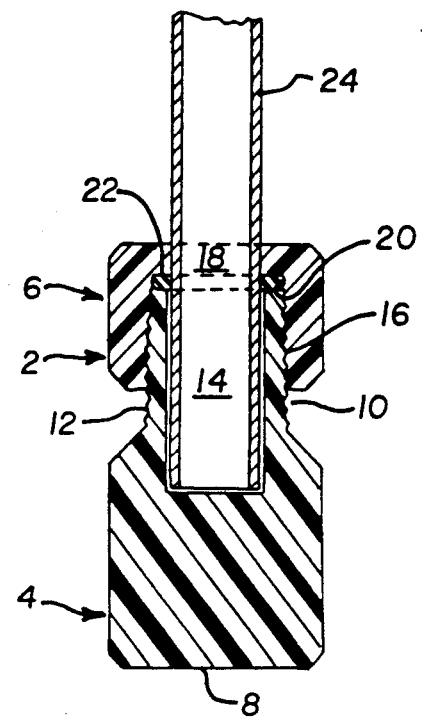
FIG. 2 is a section of the novel water line test cap shown in FIG. 1.

Referring to the drawings, reference numeral 2 refers to the novel water line test cap defined and claimed herein comprising an elongated body 4 and a nut 6 threadedly attached thereto. The body 4 is closed at one end 8 and the opposite end thereof 10 is provided with external threads 12 and with an elongated cylindrical recess 14 extending outwardly therefrom.

The nut 6 is provided with internal threads 16 adapted to be threadedly attached to the body 4 by means of external threads 12.

The nut 6 is also provided with a bore 18 communicating with said elongated cylindrical recess 14. The nut 6 is additionally provided with a circular seat 20 in which is seated an O-ring 22 made of an expandable material, such as rubber, neoprene, etc. The O-ring 22 is disposed between the outer free surface of the body 4 and the adjacent inner surface of nut 6. It is imperative that elongated cylindrical recess 14, the bore 18 and the O-ring 22 have the same internal diameter that will permit the entry therethrough of a water pipe or line 24 into the water line test cap 2.

When testing of a water line is to be made, the free end of the water line 24 is inserted through bore 18 and subsequently through O-ring 22. Thereafter the body 4 is threaded into nut 6, making sure that the end of line 24 remains within elongated cylindrical recess 14. Tightening of the body 4 into nut 6 will compress O-ring 22, forcing the inner portion thereof to expand and thereby securely grip water line test cap 2 securedly to the pipe 24. The pipe 24, with its attendant lines, can then be filled with water and can be checked for water leakage. The water line test cap 2 can thereafter be easily removed from the pipe 24, after the water is shut off, by merely reversing the procedure described above, that is, by detaching body 4 from nut 6 and then sliding nut 6 off pipe 24. Alternatively, the water line test cap 2 can be mounted onto pipe 24 as a unit; that is, the unit is placed on the pipe 24, with the elongated body 4 being loosely attached to nut 6, and only then is elongated body 4 tightened into nut 6.

Often when plumbing lines are tested for water leakage when a building is under construction, it is also highly desirable to bleed some of the air that may be present in the water to avoid "water-knocks". This can easily be effected in accordance with my preferred embodiment as illustrated in FIG. 3.

For example, the elongated cylindrical recess 14 can be extended completely outwardly through said one end 8 of body 4 to form a bore 26 (that also includes elongated cylindrical recess 14) wherein means are then provided for bleeding air from the water in line 24. One such means is illustrated in FIG. 3. Thus, bleeding device 28 is suitable and comprises a vertical circular wall 30, provided with external threads 32 for attachment to body 4 through internal threads 34 in bore 26, and a cover 36, provided with a valve opening 38 therein forming a valve seat 40. Parallel to cover 36, and at a distance therefrom, there is securedly mounted a similar member 42, similarly provided with a valve opening 44 therein forming a valve seat 46. The member 42 can be securedly attached to the device 28 in any convenient manner, for example, by providing the same with external threads for attachment to corresponding lower internal threads in vertical circular wall 30. Disposed between cover 36 and member 42 is a spring 48 encircling a plunger 50 provided with valves 52 and 54, fixedly attached thereto, capable of fitting into valve seats 40 and 46, respectively. To facilitate attachment of valves 52 and 54 to plunger 50, the valves can be threaded thereto. In such case, water is normally prevented from escaping bore 26, but when bleeding is desired all that is needed is to push plunger 50 upwardly, thereby unseating valves 52 and 54, and permitting air, and some water, to escape from bore 26 through valve openings 38 and 44. If desired, the external lower portion of bleeding device 28 can be threaded to attach a cover thereto to protect plunger 50 from being inadvertently actuated.

Figure 3:
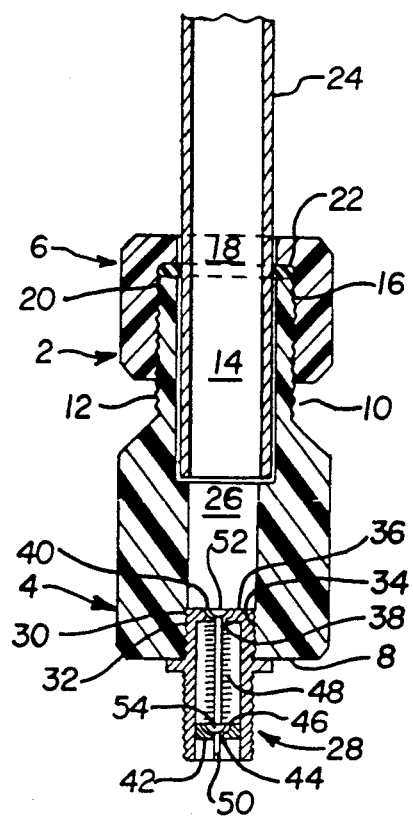
FIG. 3 is a section of a preferred embodiment of the novel water line test cap showing a means therein for bleeding air from the water line.

The device illustrated in FIG. 3 was attached to a copper water line in accordance with the description given above to determine whether or not it would be retained in place during usage. Normal commercial water pressure is in the range of about 50 to about 60 pounds per square inch. The water pressure applied during the test was in increments of about 100 pounds per square inch. When a pressure of 200 pounds per square inch was reached, the water line test cap remained securedly in place and no water leakage or pressure, drop was noted. When the pressure reached 465 pounds per square inch gauge, the water line test cap separated from the copper water line tubing and could not be tightened further to maintain it in place. Accordingly, it can be seen that the novel water line test cap described and claimed herein can readily be used in normal commercial usages.

Obviously, many modifications and variations of the invention, as hereinabove set forth, can be made without departing from the spirit and scope thereof, and therefore, only such limitations should be imposed as are indicated in the appended claims.

I claim:

1. A novel water line test cap comprising an elongated body closed at one end and having an elongated cylindrical recess extending outwardly therefrom and external threads at the outer end thereof, an internally threaded nut threaded to said elongated body at said other end thereof, said nut being provided with a bore communicating with said elongated cylindrical recess, and an expandable O-ring disposed therein adjacent said elongated body, said cylindrical recess, said bore and said O-ring being linearly disposed and having the same internal diameter sufficient to permit the entry of a water pipe therein.

2. The water line test cap of claim 1 wherein said O-ring is disposed between the outer free edge of said elongated body and the adjacent surface of said nut.

3. The water line test cap of claim 1 wherein the closed end of said body is provided with means capable of bleeding the interior of said water line test cap.

4. A novel water line test cap comprising an elongated body closed at one end and having an elongated cylindrical recess extending outwardly therefrom and external threads at the other end thereof, an internally-threaded nut threaded to said elongated body at said other end thereof, said nut being provided with a bore communicating with said elongated cylindrical recess, and an expandable O-ring disposed therein adjacent said elongated body, said cylindrical recess, said bore and said O-ring being linearly disposed and having the same internal diameter sufficient to permit the entry of a water pipe therein, said O-ring being disposed between the outer free edge of said elongated body and the adjacent surface of said nut, the closed end of said body being provided with means capable of bleeding the interior of said water line test cap comprising a body mounted in said elongated body communicating with said elongated cylindrical recess and having disposed therein spring-activated valve means permitting communication between said elongated cylindrical recess and the exterior thereof.

* * * * *